Feb. 18, 1958          F. E. BROWN          2,823,500

MACHINE FOR ASSEMBLING HYPODERMIC SYRINGES

Filed Sept. 13, 1954          7 Sheets-Sheet 1

INVENTOR.
FRANK E. BROWN
BY
HIS ATTORNEYS

Feb. 18, 1958  F. E. BROWN  2,823,500
MACHINE FOR ASSEMBLING HYPODERMIC SYRINGES
Filed Sept. 13, 1954  7 Sheets-Sheet 3

INVENTOR.
FRANK E. BROWN
BY
Connolly + Hutz
HIS ATTORNEYS

Feb. 18, 1958     F. E. BROWN     2,823,500
MACHINE FOR ASSEMBLING HYPODERMIC SYRINGES
Filed Sept. 13, 1954     7 Sheets-Sheet 4

INVENTOR.
FRANK E. BROWN
BY
HIS ATTORNEYS

Feb. 18, 1958 F. E. BROWN 2,823,500
MACHINE FOR ASSEMBLING HYPODERMIC SYRINGES
Filed Sept. 13, 1954 7 Sheets-Sheet 5

INVENTOR.
FRANK E. BROWN
BY
Connolly + Hutz
HIS ATTORNEYS

Feb. 18, 1958 F. E. BROWN 2,823,500
MACHINE FOR ASSEMBLING HYPODERMIC SYRINGES
Filed Sept. 13, 1954 7 Sheets-Sheet 6

INVENTOR.
FRANK E. BROWN
BY
HIS ATTORNEYS

United States Patent Office 2,823,500
Patented Feb. 18, 1958

2,823,500

MACHINE FOR ASSEMBLING HYPODERMIC SYRINGES

Frank E. Brown, Burbank, Calif., assignor to Chas. Pfizer & Co., Inc., Brooklyn, N. Y., a corporation of Delaware Application September 13, 1954, Serial No. 455,566

7 Claims. (Cl. 53—53)

This invention relates to a machine for assembling hypodermic syringes, and more particularly, to the filling and stoppering of cylindrical containers, such as glass hypodermic syringe vials and the like. The invention is especially concerned with the provision of a machine which is capable of performing these operations on a fully automatic basis.

While a wide variety of hypodermic syringes are known in the art and extensively used in administering medicaments, many of the operations associated with the assembly, filling and sealing of these syringes are even to this day performed by hand. In some instances these operations have been partially mechanized in the pharmaceutical industry, but complete mechanization has not heretofore been achieved on a practical or economical basis. The greatest difficulties in this respect have been encountered in the orientation and conveyance of the many delicate or complex parts which go into the assembly of such devices and in maintaining the necessary conditions of sterility during their assembly.

To meet this problem, a fully automatic machine for assembling, filling and sealing hypodermic syringe vials and attaching needles thereto is described and claimed in my copending application Serial No. 455,564, filed September 13, 1954, now Patent No. 2,765,606. This machine is particularly adapted to produce a syringe cartridge and needle assembly as described in my copending application Serial No. 264,992, filed January 4, 1952, now Patent No. 2,737,949. The assembly shown therein is comprised of a cylindrical container or vial, preferably of glass, having a reduced neck portion terminating in an annular lip, a flanged stopper in the neck portion, a ferrule retaining the stopper therewithin, a protected needle carried by the stopper and ferrule, and a plunger in the other end of the cylinder. The plunger is a conventional type consisting of a cylindrical body of resilient material, such as rubber, provided with circumferential ribs about the outer periphery thereof and further provided with a threaded stud imbedded in one end to facilitate attachment of an elongated actuating plunger thereto. Since the resilient plungers serve in part as stoppers for the medicament in the vials, they are referred to herein as "plunger stoppers." The flanged stoppers which seal the other end of the vials are referred to herein as "closure stoppers."

The feeding, orientation and insertion of the plunger stoppers into hypodermic syringe vials is described and claimed in my copending application Serial No. 455,565, filed September 13, 1954. While a number of difficult problems are involved in providing a machine to perform these operations, the provision of a machine which thereafter fills and stoppers the vials on a fully automatic basis presents equally difficult problems, if not more so. One such problem arises in filling or metering a measured amount of medicament into the vials, an operation which is complicated by the high degree of accuracy demanded in the pharmaceutical industry and by the small size of the vials which are to be filled. In addition, the orientation of the flanged closure stoppers has heretofore been extremely difficult in view of their very small size and their resilient properties, making them troublesome to handle. Another problem involved in providing a fully automatic machine of the nature described arises from the need for inspection of vials prior to filling, to assure that they are properly positioned and contain therein the necessary plunger stoppers.

The above noted difficulties have been obviated by providing a machine which collects, collates, associates and assembles the various components of the syringe cartridge in a unitary, uninterrupted, automatic operation and successfully integrates the diverse functions inherent in the operation in an economical apparatus. This is achieved by unique association of supply and forming operations in such manner that the cartridges enter the machine as independent component parts and emerge as finished products ready for sale. It will be appreciated that this is a substantial accomplishment in view of the nature of the components handled and the critical necessity for maintaining sterile conditions, while at the same time obtaining a product output rate which doubles that for similar known prior art techniques without costly breakage. The details of this machine are fully set forth in my copending application Serial No. 455,564, as noted previously, and the present application comprises a division thereof.

The present invention is directed to that portion of the machine which fills the glass vials with a medicament and immediately seals the same by insertion of a closure stopper. Broadly, the invention comprises a filling and closing mechanism for cylindrical containers in which a simple chain type conveyor carrying container supporting means for transporting the glass vials is positioned to traverse a linear path in proximity with a source of medicament and a source of closure stoppers, together with means cooperatively associated therewith to fill and stopper the vials. In a preferred form of the invention inspection means are also provided to detect the presence of defective vials and remove them from the conveyor and to determine that the vials are properly positioned before the filling operation can take place.

A particular feature of the invention is an arrangement whereby the above noted functions are fully controlled and coordinated by a single control shaft operated at a constant speed. Another feature of the invention is an arrangement whereby the closure stoppers may be fed to the machine at random and oriented before being applied to the filled vials without necessitating frequent stoppages or frequent replenishment of the supply. Yet another feature of the invention is the provision of a medicament pumping means which injects precisely measured quantities of medicament into each vial.

The inspection, filling and stoppering of hypodermic syringe vials in accordance with the present invention may best be understood by reference to the accompanying drawings and the descriptive matter relating thereto. With reference to the drawings:

Fig. 5 is a plan view of the electrical control mechanism of Fig. 4;

Figs. 6 to 6d are schematic representations illustrating the various stages of operation of the filling device of Fig. 4;

Fig. 7 is a chute section view along the center of the resilient support for the closure stopper feed chute mechanism of Fig. 2;

Figures 1, 2:
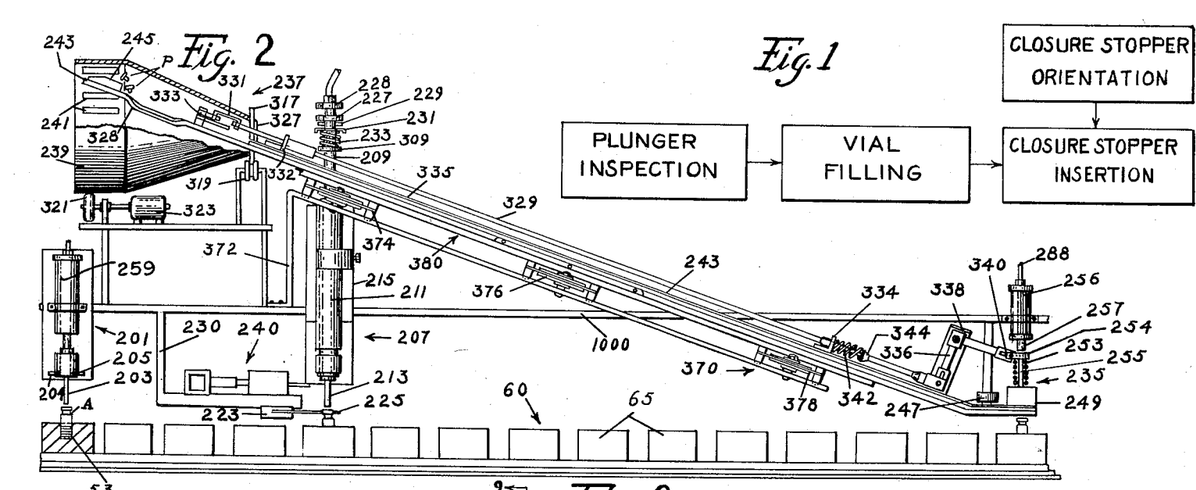
Fig. 1 is a block diagram showing the various operations performed according to the invention.
Fig. 2 is a schematic representation in elevation illustrating the cooperative relationship between the major elements of Fig. 1.

The various operations performed in accordance with the present invention and their sequence are readily seen from the block diagram of Fig. 1. The vials which have previously been provided with plunger stoppers are subjected to an inspection in order to determine whether or not they are in suitable condition for the filling operation which occurs thereafter. In this stage the vials which are not in such condition are rejected from the machine. The others are, of course, filled to the desired level in the vial filling stage and are then transported to the closure stopper insertion stage wherein the closure stoppers are inserted. The closure stoppers in turn are fed to this insertion stage from an orientation mechanism designed to deliver them in unidirectional alignment for the insertion operation. After insertion of the closure stoppers, the stoppered vials may proceed to a remote station for subsequent operations, such as aluminum cap sealing and the like.

While it is preferred to employ a machine having two assembly lines simultaneously performing these operations, as in the plunger stoppering machine of my copending application Serial No. 455,565, filed September 13, 1954, it is understood that the operations may be performed in both single and multiple assembly lines. In fact, since the mechanisms involved in each assembly line are in this instance substantially identical, the present invention will be described with respect to but one such line.

A machine which performs the described operations is more particularly shown in the schematic representation of Fig. 2. The vials A, containing resilient plungers 53 acting as stoppers near the base thereof, are situated within a series of spring-loaded blocks 65 on a conveyor 60 which conveys them through the machine by means of a chain drive (not illustrated). While all of the vials will normally contain plunger stoppers, occasionally a vial may be introduced without such a plunger or with the plunger improperly positioned. In such event, the valuable liquid medicament with which it is to be filled would simply pass through the vial and become deposited within the blocks 65, causing clogging and other deleterious effects in the mechanism. To avoid this contingency, a vial inspection device, generally indicated at 201, is provided for the purpose of inspecting each vial before filling and for rejecting those that may be lacking a plunger. This is accomplished by means of a reciprocating finger 203 which projects within the vial and detects the presence or absence of a plunger. A pair of pivoted gates or jaws 204 and 205 are provided above finger 203 to grip the throat of vial 53 and withdraw the vial in those instances where a plunger may be lacking. Normally the plungers within the vials will arrest the downward travel of finger 203 and prevent jaws 204 and 205 from engaging the vial. However, if a plunger is missing the jaws will engage the throat of the vial, remove the same from block 65 and reject such a vial from the machine upon elevation of the device.

After inspection, the vials progress to the filling mechanism, generally indicated at 207, which meters and fills them with a measured amount of medicament. This is accomplished by means of a reciprocating type pump comprising a movable cylinder 211 and piston 209 unit. The base of cylinder 211 is provided with a needle or discharge tube 213, which is adapted to project within vials 53 and successively fill them from the bottom up. To this end, cylinder 211 is reciprocated through a yoke 215 operated by a cam. The cylinder is advanced toward the vials through the action of gravity cooperating with a spring normally under tension. An electrically actuated stop mechanism 220 is provided to prevent the downward travel of yoke 215 and cylinder 211 except when a vial is positioned immediately beneath the filling needle 213. This stop mechanism is actuated by a microswitch 223 having an arm 225 contacting each vial as it becomes properly positioned beneath needle 213.

The volume of material metered and dispensed by the filling mechanism is controlled by the relative movement beneath piston 209 and cylinder 211. The piston is adapted to reciprocate with the cylinder, but is limited as to its downward travel by a pair of locknuts 227 and 228 which engage a stationary fork or stop mechanism 229. Locknuts 227 and 228 are adjustable to permit varying the capacity of the mechanism. The upward travel of piston 209 is also limited by the stop mechanism 229 through a sleeve 231 and spring 233 carried thereby. The liquid medicament to be dispensed is fed to the device through a tube 213 from a suitable reservoir not shown. The operation of this device will be more fully described hereinafter.

The filled vials then proceed in the conveyor blocks 65 to the closure stopper insertion mechanism generally indicated at 235, where they are stoppered. However, before stoppering can occur, the closure stoppers must first be properly oriented so that they can be fed to the stopper insertion mechanism in unidirectional alignment. The orientation mechanism generally indicated at 237 consists of a rotating hopper or drum 239 provided with a series of longitudinal scoops 241 about the inner periphery thereof, for picking up the stoppers and transferring them to the orientation chute 243. The details of this mechanism will be described more fully below. Its basic structure consists of the chute 243, which is provided with a central channel for receiving the stoppers and a twist for the purpose of rejecting those stoppers which are not properly positioned within the channel. The top of chute 243 carries a shovel 245 which receives the stoppers P from the scoops 241 and directs them toward the channel within chute 243.

After the stoppers have been properly oriented, they are conveyed by gravity feed down inclined chute 243 to the stopper insertion mechanism 235. They are preferably assisted in this action by a vibrator 247 connected with the discharge end of chute 243. The closure stopper insertion mechanism has a housing 249 for receiving the stoppers and positioning them above a discharge hole which connects with the vials. This housing receives a reciprocating plunger 253 which drives the stoppers into the vials. A spring 255 is provided for the purpose of normally urging plunger 253 upward. The plunger is urged downward for a stoppering operation by means of a pneumatically operated servomotor 256 having a reciprocating piston 257.

The plunger stopper inspection mechanism 201, filling mechanism 207 and closure stopper insertion mechanism 235 are all mechanically synchronized for intermittent operation with conveyor blocks 65 which undergo stepwise movement. The result is a filled and stoppered vial having a plunger at one end and a perforable closure stopper at the other end which may be used per se, or which may be further sealed and treated in subsequent operations forming no part of the instant invention.

*Details of the plunger stopper inspection mechanism*

Figure 3:
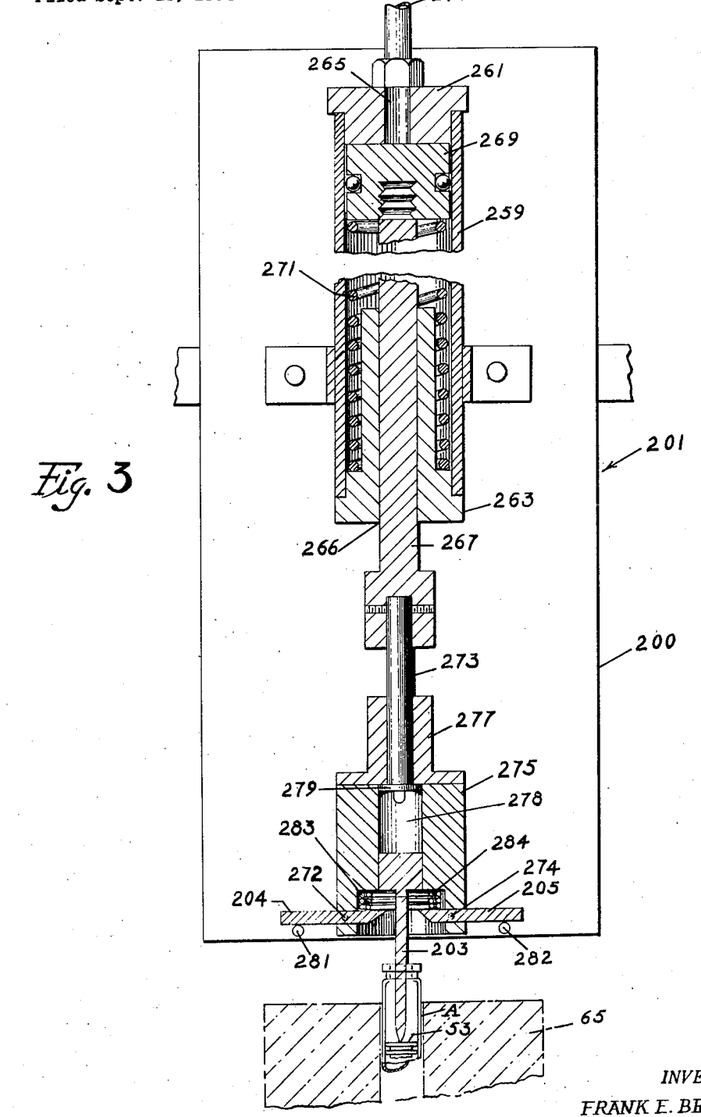
Fig. 3 is an elevation, partly in section, showing the details of the plunger inspection device of Fig. 2.

The plunger stopper inspection device of Fig. 2 is shown in greater detail by the sectional view of Fig. 3. As indicated above, this device is actuated by a pneumatically operated plunger which effects periodic reciprocation of the inspection mechanism each time a vial is positioned therebeneath. The pneumatic mechanism comprises a cylinder 259 provided with closure caps 261 and 263 at the top and bottom thereof, respectively. Cap 261 contains a passage 265 for receiving compressed air, while cap 263 is provided with a similar passage 266 for receiving a central plunger actuator or piston rod 267. The top of rod 267 carries a piston 269 which impells rod 267 downward under the force of the compressed air. Piston 269 and rod 267 are returned after each stroke to the position shown, by spring 271 operating against the base of the piston.

The end of plunger 267 carries an extension 273, which in turn carries the inspection mechanism proper. As previously explained the heart of this inspection mechanism centers around a pair of pivoted jaws or gates 204 and 205 which engage the throat of each vial lacking a plunger stopper in its base and remove the same from the vial-supporting blocks 65. (The jaws are pivotally carried on pins 272, 274 by a body 275, slidably disposed with respect to extension 273 through a sleeve 277 retained about extension 273 by a collar 279. The inspection finger 203 is, of course, carried by body 275 for the purpose of detecting the presence or absence of a plunger stopper in each vial, and is fixedly positioned, as by splines, peening, or the like, in the end of a cavity 278 forming a passage for receiving the end of rod extension 273.

A pair of trip pins 281 and 282 are disposed in a fixed position on a support 200 which also supports cylinder 259. The trip pins cooperate with the pivoted jaws for the purpose of ejecting from the inspection mechanism those vials which are picked up by the jaws and removed from the blocks 65. Jaws 204, 205 are normally retained in a horizontal position by means of springs 283 and 284 situated within body 275.

The operation of the inspection device will be understood as follows. From the above description it will be apparent that Fig. 3 shows the inspection device in a state of rest. At such time as a block 65 carrying a vial A becomes situated directly beneath the device, a valve, not shown, delivers compressed air to the cylinder to reciprocate piston 269, thereby advancing rod 267, extension 273, and the entire body of the device downwardly toward the vial. This movement continues until finger 203 engages the top of the plunger stopper 53 within the vial, arresting the downward travel of body 275, as well as jaws 204 and 205. The length of finger 203 is so chosen with respect to the dimensions of the vial and the desired position of the plunger stopper therein, that jaws 204, 205 will be prevented from engaging the throat of the vial as long as a plunger stopper is present and properly situated within the vial. In those instances where the plunger stopper may be absent or only partially inserted within the base of the vial, the body 275 continues to move downwardly and the jaws will trip over the flange of the vial, engage the throat, and upon elevation of piston 269 withdraw the vial from the blocks 65.

Continued elevation of piston 269, which of course carries body 275 therewith, results in the engagement of trip pins 281 and 283 by the outer portions of jaws 204 and 205, respectively. This causes the vial engaging portions of the jaws to pivot upwardly and recede from the vial, permitting the vial to drop from the device to the conveyor therebelow where the rejected vials may be retrieved by an operator or a suitable conduit. Sleeve 277 is slidably disposed about extension 273 to permit body 275 and the jaws connected thereto to be arrested in their downward travel, without interfering with the stroke of the pneumatic actuating mechanism 259, 269.

Details of the vial filling mechanism

Figure 4:
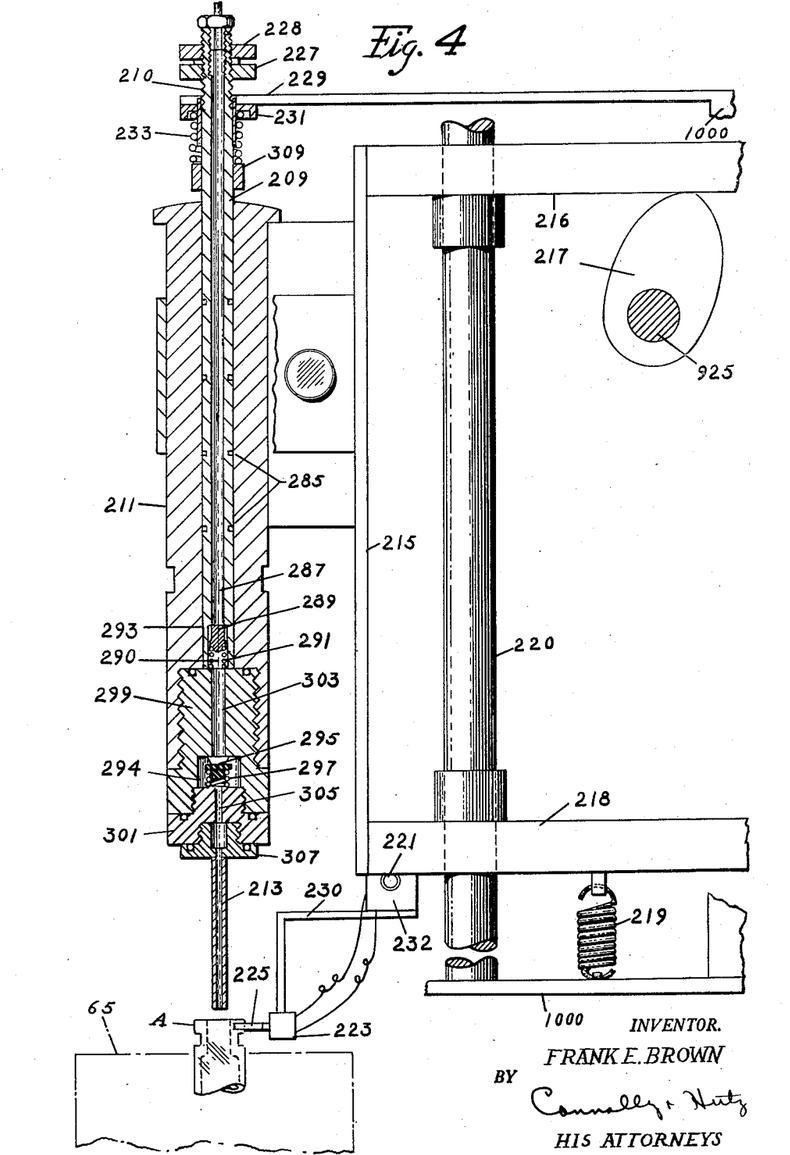
Fig. 4 is an elevation, partly in section, showing the details of the filling device of Fig. 2 and the control mechanism therefor.
Figures 6, 6A, 6B, 6C, 6D:
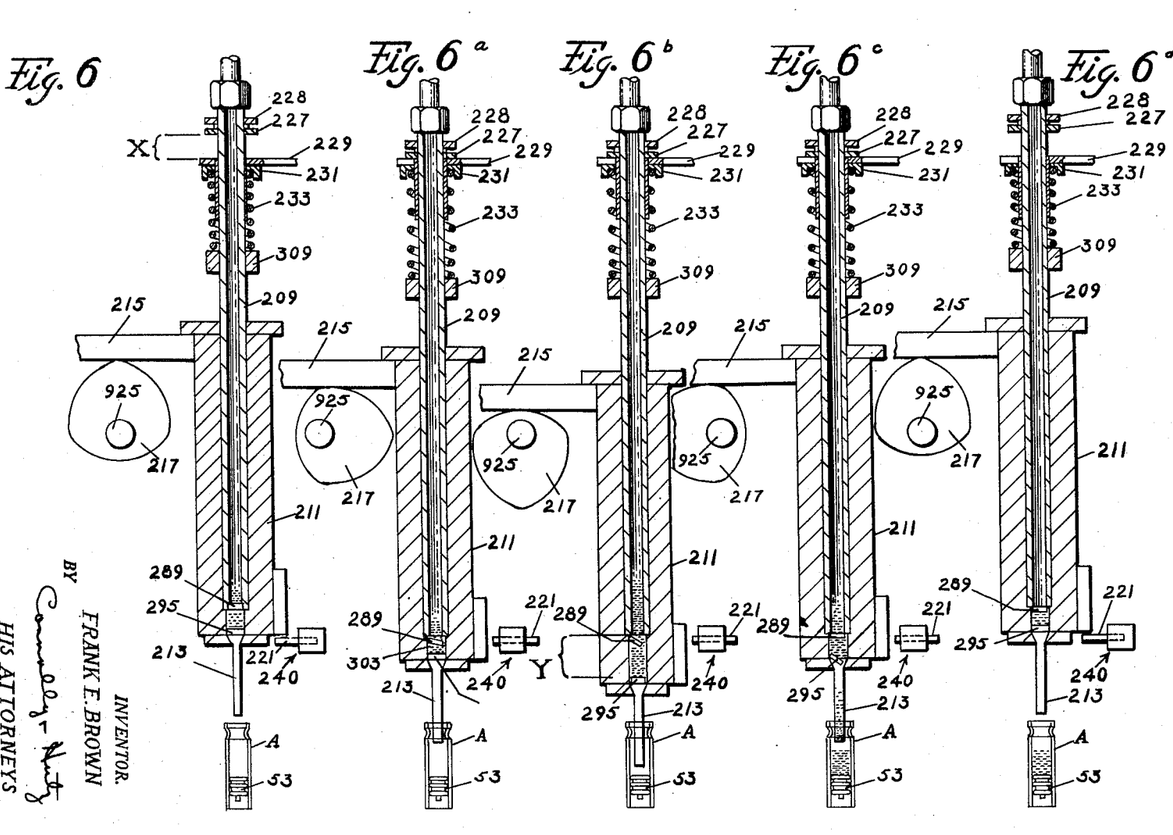

Further details on the filling and associated control mechanisms are shown in Figs. 4 and 5, while the various stages of operation of the filling pump are illustrated schematically in Figs. 6 to 6d inclusive. As previously described, the filling mechanism consists essentially of a reciprocating piston and cylinder unit 209, 211 which meters and delivers a measured amount of medicament to the vials through a needle 213. The piston is formed as an elongated rod-like member 209 having a series of lubrication rings 285 in its outer periphery to insure an effective seal and to facilitate relative movement between the two components. Piston 209 is further provided with a central passage 287 extending therethrough for the purpose of receiving liquid medicament from a reservoir (not illustrated) and delivering the same to the base of the piston. Normally, the inner end of thte piston rod rests on the shoulder of a threaded coupling member 299 connected to the cylinder 211.

At its inner end, the piston is counterbored to receive a check valve consisting of a rubber diaphragm 289 and a spring 291 normally urging the diaphragm upward to obstruct passage 287. The valve is retained on the piston by a small axially extending collar 293.

Beneath this check valve a second rubber diaphragm 295 and a second spring 297 are provided to form another check valve for the purpose of retaining medicament in the pump while the pump is being filled. The lower valve is positioned in a compartment 294 formed by two threaded coupling members 299 and 301 which have central passages 303 and 305 therethrough for passage of the medicament. The passageway 305 in cooperation with valve 293 in compartment 290 and valve 295 in compartment 294 forms a minature reservoir for the medicament which is normally retained in a filled condition. This effectively eliminates surges and irregular flow. Filling needle 213 is provided with a threaded hub 307 for attaching needle 213 rigidly to coupling 301.

Both cylinder 211 and piston 209 are reciprocated by a cam 217 carried on a control shaft 925 and a spring 219 operating against the yoke 215 which is rigidly secured to the cylinder. For this purpose the yoke includes a pair of vertically spaced bars 216, 218 which move up and down on guide rods, only one of which is illustrated at 220 in the figure. The guide rods 220 are in turn supported from a portion of the main support 1000 which also carries the fixedly positioned stop fork 229.

As previously explained, the downward travel of piston 209 is controlled by adjustable locknuts 227 and 228 on a threaded extension 210 and which engage the stationary fork 229 and arrest further movement of the piston on the down stroke. These locknuts can be adjusted to achieve a fine degree of control in medicament measurement, the volume of medicament being increased by lowering the locknuts with respect to piston 209 and decreased by raising them. Upward travel of piston 209 is limited by spring 233 carried and retained between a fixed collar 309 and a slidable sleeve 231. The arrangement is such that the strength of spring 233 is sufficient to overcome the frictional resistance of piston 209 in cylinder 211 during the filling operation to be described more fully hereinafter.

The pump is normally prevented from functioning by a blocking mechanism 240 until such time as a vial is positioned beneath needle 213 for a filling operation. The electrical control system which withdraws pin 221 and thereby permits the pump to function is shown in greater detail in Fig. 5. As illustrated, the mechanism 240 comprises a conventional electric solenoid unit 226 which is supported on a bracket 230, forming part of the main support 1000, and is directly connected to the blocking pin 221. The pin, in turn, is reciprocably mounted in a guide block 232 on the bracket 230 and is normally urged to an extended position in which it projects beneath the pump yoke 215 by a spring 236 positioned between the coil form of the solenoid and a collar 238 on the movable core.

Solenoid 226 is connected in a series circuit with any conventional source of electrical energy 310 and the micro-switch unit 223 carrying the vial engaging finger 225. The unit 223 is normally in a circuit-deenergizing condition whereby spring 236 urges pin 221 under yoke 215 (see Fig. 4), but can be actuated to a circuit closing condition by movement of finger 225.

Thus, it can readily be seen that as vial A engages arm 225, the contacts of micro-switch 223 will become closed, energizing the solenoid 226, and withdrawing pin 221 from beneath yoke 215. This permits the yoke to move down with the pump to perform a filling operation. As long as vial A continues in engagement with arm 225, solenoid 236 will remain energized and pin 221 will remain in the withdrawn position as shown. Upon removal of vial A, arm 225 will break the micro-switch contacts and de-energize the solenoid, permitting spring 236 to return pin 221 beneath yoke 215.

The operation of the pump is more particularly shown in the schematic diagrams of Figs. 6 to 6d inclusive. Fig. 6 illustrates the pump in a static condition, as in Fig. 4, with pin 221 in position to prevent pump operation. In this position cam 217 periodically engages yoke 215, causing the yoke to become slightly elevated above pin 221 for withdrawal of the pin when a vial becomes positioned beneath the pump. Fig. 6a illustrates the position of the various components immediately after pin 221 is so withdrawn, yoke 215 engaging cam 217 and continuing downwardly therewith. The downward travel of piston 209 is arrested by locknuts 227 and 228 as soon as the latter strike fork 229. At this point the check valve 289 within piston 209 begins to open and permit medicament to enter the chamber formed by passageway 303 therebeneath, the check valve 295 in cylinder 211 remaining closed.

Cylinder 211 continues downwardly until the bottom of the stroke is reached, as determined by cam 217, filling the pump chamber with a predetermined quantity of liquid medicament. This condition is illustrated by Fig. 6b wherein the needle projects within vial A to a point near the base of the plunger stopper 53. The quantity of medicament contained in the pump and to be dispensed thereby is, of course, in proportion to distance Y indicated in Fig. 6b. This distance is determined by the distance between locknut 227 and fork 229 when the pump is in the static condition as in Fig. 6, i. e., distance X.

As soon as cylinder 211 has reached the bottom of its stroke, cam 217 proceeds to automatically elevate the same, thereby dispensing medicament from the pump into vial 53 filling the vial from the bottom at needle 213 is elevated with the cylinder 211. This phase of operation is illustrated in Fig. 6c. During this period the check valve 289 in piston 209 closes while the check valve 295 in cylinder 211 opens. The filling operation continues until cam 217 fully elevates cylinder 211 to a point where the top of the coupling member 299 of the cylinder engages the lower end of the piston. At this time yoke 215 becomes elevated above pin 221 as shown in Fig. 6d, permitting the pin 221 to arrest the pump upon withdrawal of the vial therebelow which causes de-energization of the solenoid holding the pin.

Details of the closure stopper feed and orientation mechanism

After filling, the vials proceed to the closure stopper insertion mechanism wherein they are stoppered with a small resilient stopper having a central plug portion and a flange which abuts the flanged neck on the vial. Before stoppering can take place, however, the closure stoppers must be oriented in unidirectional alignment from a random condition in a supply hopper for feeding to the stopper insertion mechanism. This is accomplished by the orientation mechanism of Fig. 2, wherein 239 is a supply hopper provided with a series of scoops 241 adapted to pick up and rotate the stoppers, tumbling them into the upper portion of the hopper. One end of the hopper is provided with a flange 317 which rides in a grooved wheel 319 while the other end rests on a rubber lined motor driven wheel unit 321 (only one of which is illustrated) which rotates the hopper by means of a motor 323.

Figures 8, 9:
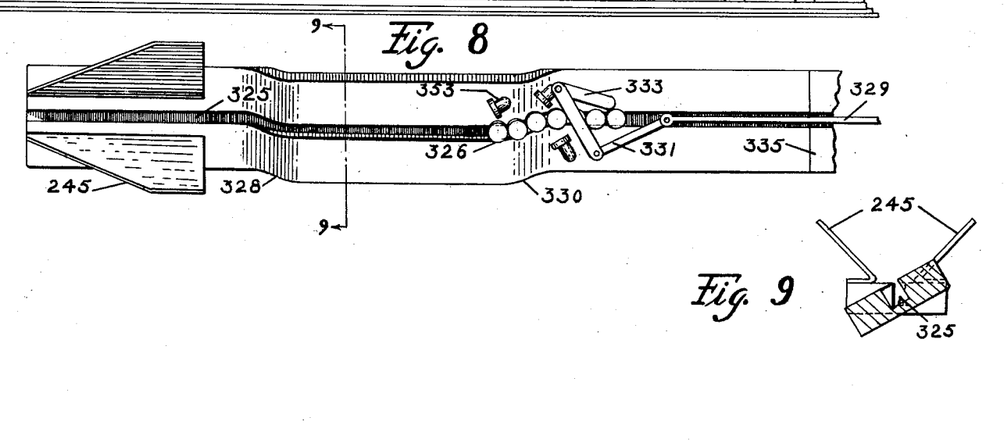
Fig. 8 is a plan view of a portion of the closure stopper orientation mechanism of Fig. 7.
Fig. 9 is a section view along line 9—9 of Fig. 8.

An orientation chute 243 extends within hopper 239 to receive the tumbled stoppers, orient them, and convey them to the stopper insertion mechanism 235 at the lower end of the feed chute. As shown more clearly in Figs. 8 and 9 the central portion of this chute is provided with a channel 325 of a depth and width sufficient to receive the plug portion of the stoppers, while permitting the flange portion to ride on the upper face of the chute as indicated at 326 in Fig. 8. A shovel 245 on the upper end of this chute receives the tumbled stoppers and directs them into channel 325. Since not all of the stoppers will be correctly positioned in channel 325 by shovel 245, a portion of the chute within hopper 239 is provided with a twist or bend, as shown as 328, 330. The angle of this twist may vary from 5 to 40°, depending upon the dimensions of the stoppers and the center of gravity thereof. In general, however, the angle is such that the center of gravity of improperly positioned stoppers provides a sufficient force-couple to cause such stoppers to move laterally under gravity to be rejected and tumbled back into the hopper, whereas those that are oriented as desired will remain in channel 325. A semicircular shield 327 is carried by chute 243 to retain the stoppers within the hopper as the latter is rotated.

In order to insure against possible overlapping of stoppers within channel 325 a reciprocating rod 329 is carried by the chute on brackets 332, 334 for the purpose of agitating the column of stoppers before leaving the confines of the hopper. For this purpose rod 329 extends through a hole in shield 327 and connects with a pivoted link 331, operating a wiper 333 which sweeps over the upper surface of the oriented stoppers. The wiper is a V-shaped structure pivoted at one side of the upper surface of chute 243 and to link 331. The wiper arrangement is best shown in the plan view of Fig. 8.

Rod 329 runs the length of the feed chute and is synchronized with the stopper insertion mechanism for reciprocation each time a stopper is inserted in a vial. For this purpose the end of rod 329 is pivotally connected with one arm of a bell crank 336 mounted for rocking movement in a vertical plane on bracket 338 supported near the end of the feed chute. The other arm of the bell crank is connected by a pin and slot arrangement 340 to the reciprocating plunger 253 of the insertion mechanism. The arrangement is such that movement of plunger 253 will rock bell crank 336 and reciprocate rod 329. To assist returning the rod to its initial position and to relieve the stress on spring 255 of the insertion mechanism, a second spring 342 is positioned over the rod between guide bracket 334 and a fixedly carried collar 344.

Outside hopper 239 the chute is provided with a cover 335 which retains and protects the oriented stoppers during their travel to the insertion mechanism. This travel is assisted by the vibrator unit 247 which contacts the chute at its lower, discharge end and continuously jiggles the same. Rod 329 is mounted above this cover on the support and guide brackets. The chute 243 is supported midway of its descent by means of a stationary resilient support structure 370. This structure includes a stationary standard or bracket 372 which is fixedly connected to the main support and which in turn carries a chute supporting unit 380. The unit 380 is shown fragmentarily in Fig. 7 and comprises an elongated trackway 382 having raised sidewalls 384 for the purpose of firmly and fixedly receiving the feed chute 243 therein. The trackway is in turn resiliently supported from the bracket 372 by means of three spaced cushion units 374, 376 and 378. As shown in Fig. 7, each such unit includes a rubber or other resilient material grommet 386 permanently bonded to a thin metallic boundary strip 388. The strip 388 is fixedly connected at longitudinally spaced ends to the trackway 382 by means of threaded clamping studs 390, 392. The grommet, in turn, is connected to the bracket 372 by a bolt 390 carried by the bracket and projecting through a central bore 394 in the grommet. The grommet is locked to the bolt by means of a nut 396. A series of cavities 398 are formed in the bracket and in the trackway to eliminate any metal to metal contact and to accommodate lateral sway in chute 243.

This arrangement effectively reduces noise and implements obtaining a constant amplitude of vibration for the feed chute whereby feeding surges and the like difficulties are obviated. A particular feature of this resilient support arrangement is the isolation or dampening of unwanted vibrations of varying magnitudes which are present due to the intermittent operation of the other components of the machine. It is thus possible to mount all of the operating components on a single support 1000 of simplified and inexpensive design.

Details of the stopper insertion mechanism

Figure 10:
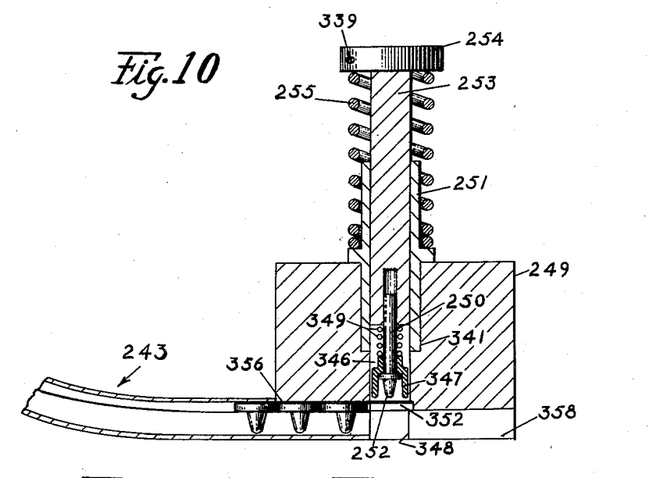
Fig. 10 is an elevation, partly in section, showing the details of the closure stopper insertion mechanism of Fig. 2.

The base of the chute is provided with a curve to introduce the stoppers into the stopper insertion mechanism 235 in position for insertion into a filled vial. This mechanism, shown in detail in Figs. 10 to 11b inclusive, consists of a housing 249 which is provided with a passageway 341 supporting a sleeve 251 through the central portion thereof for receiving a stopper insertion plunger 253. A spring 255 positioned about sleeve 251 and plunger 253 and operating against a head 254 on the plunger provides a return for the plunger after advancement of the plunger for an insertion operation. The head 254 carries a pivot pin 339 which is adapted to connect through the slot 340 on bell crank 336 to reciprocate rod 329 on the chute. The passageway 341 traverses through the housing and terminates in a reduced diameter chamber 346 in which is situated an extension 250 of rod 253. The rod extension includes a rounded plunger stopper engaging nose 252 and loosely carries a centering collar or sleeve 347. The collar or sleeve 347 is normally urged downwardly on the rod extension into contact with an abutment flange, as shown in Fig. 10, by means of a spring 349.

Figure 11:
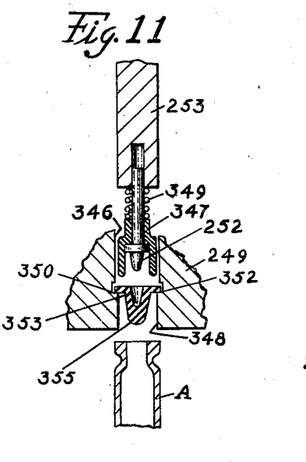
Figs. 11, 11a, and 11b are schematic representations illustrating the various stages of operation of the closure stopper insertion mechanism of Fig. 10.
Figure 11A:
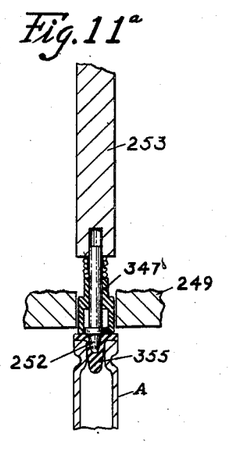

Chamber 346 includes an exit or punch-out opening 348 and a pair of opposed longitudinal recesses 350, 352 presenting support shoulders for receiving the stopper flange and seating the stopper in the proper position over the exit 348 as shown in Fig. 11. It will be understood that the housing 249 includes a slot in bottom front face, as shown at 356 in Fig. 10, for detachably receiving the discharge end of feed chute 243 so as to position its exit in direct alignment with chamber 346 and the stopper supporting shoulders 350, 352. The housing includes a further slot in the bottom face, as at 358 in Fig. 10, providing visual inspection of and access to the punch out opening 348 to facilitate the removal of deformed or jammed stoppers. As shown in Fig. 2, the insertion plunger 253 is operated by a pneumatically energized servomotor 256 having a plunger 257 which strikes the head 254 on plunger 253 each time a stopper is to be inserted in a vial. It will be understood as previously indicated that operation of plunger 253 also causes reciprocation of rod 329.

Figure 11B:
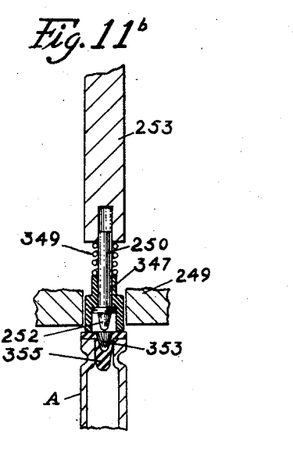

The structure and operation of the stopper insertion mechanism is more particularly shown in Figs. 11 to 11b inclusive wherein three stages of operation are illustrated. As shown in Fig. 11, chute 243 delivers the stoppers to chamber 346 in housing 249 in position above the punch-out hole 348 connecting with the vials as shown, the diameter of the stopper flange being slightly larger than the diameter of the hole. This stage shows the insertion plunger with a stopper in the static position, immediately before the insertion stroke. Upon actuation of plunger 253, stopper 355 which includes a central needle retaining groove or chamber 353 is engaged by the nose projection 252 and on the lower extension rod 250. This drives the stopper through the opening 348 and into the vial A. As the nose portion 252 enters the recess 353 of the stopper, the spring pressed sleeve or collar 347 contacts the stopper flange and serves to keep the stopper centered as nose 252 pushes it out opening 348. As the stopper enters the vial A (see Fig. 11a) the spring remains compressed placing an even pressure about the perimeter of the sealing flange. It will be appreciated that this action serves to reduce any canting or skewing of the stopper and makes the stoppering operation substantially foolproof. Upon release of the pressure upon plunger 253, spring 255, shown in Fig. 10, elevates plunger 253 while spring 349 retains sleeve 347 in contact with the stopper. This effectively strips the stopper from the plunger as shown in Fig. 11b while preventing loss of the seal.

The drive and control mechanisms

Figure 12:
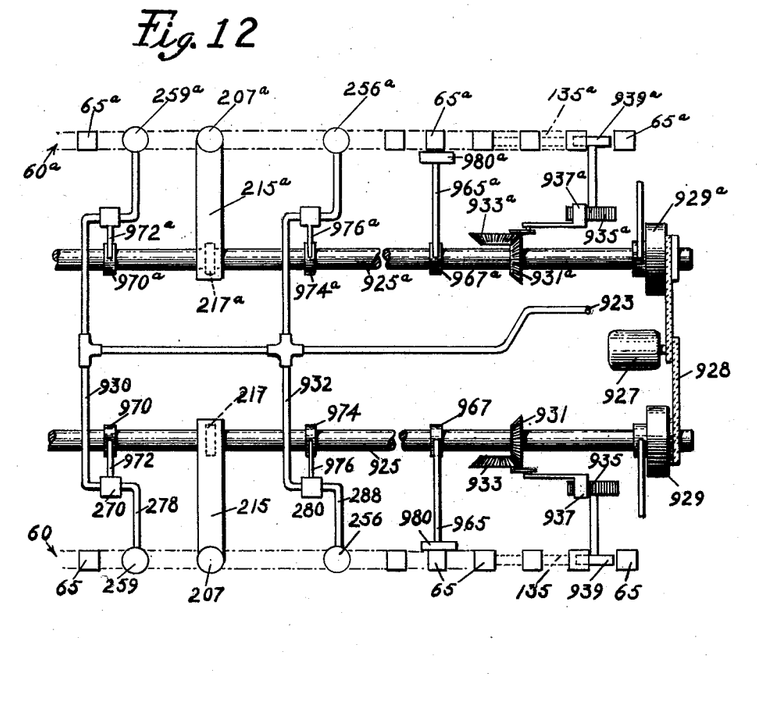
Fig. 12 is a schematic plan view of the drive and control mechanism for the machine of Figs. 1 to 11b inclusive.

As previously indicated the present invention comprises a sub-combination of a fully automatic machine for assembling, filling and sealing hypodermic syringe cartridges as more fully set forth in my copending application Serial No. 455,564, filed September 13, 1954. Such machine employs parallel endless chain conveyors which operate in cooperation with identical assembly lines comprising duplicated stations of the machine. Fig. 12 shows the main drive and control mechanisms employed for operating the two assembly lines of the machine. Basically it consists of two control and drive shafts 925 and 925a which are driven by a single motor 927 via a belt drive 928 through selectively releasable clutch mechanisms 929, 929a, respectively. Only so much of the drive and control mechanism has been illustrated as pertains to the invention disclosed in the present application, and since both assembly lines are identical, the description here will be confined to the line operated by control shaft 925. From an inspection of the figure it will be noted that control shaft 925 is adapted to be rotated by motor 927, and through gearing 931, 933 and an intermittent drive mechanism comprising a driven ratchet wheel 935 and a driving pawl 937, rotates a sprocket wheel 939 in a side wise manner. The sprocket wheel forms the driving element about which the endless chain 135 of conveyor 60 carrying blocks 65 is engaged. An idler sprocket (not illustrated) engages the other loop of chain 135 to provide an endless path for the cartridge supporting blocks 65. Shaft 925 also carries a plurality of operating cam members, 970, 217, 974, and 967. Cam 970 is connected via a follower arm 972 to actuate a control valve 270 having an inlet to a source of compressed air 923 via conduit 930 and an outlet conduit 278 to the servo-motor 259 of the plunger inspection mechanism. Cam 217, as previously more particularly described, is connected to raise and lower the yoke assembly 215 for actuating pump 207 to fill the cartridge vials with a medicament. Cam 974 is connected via a follower arm 976 to a further control valve 280 which is connected with the source of fluid pressure 923 by an inlet conduit 932 and which includes an outlet conduit 288 leading to the servo-motor 256 for the stopper insertion mechanism. The final cam 967 is connected via a follower arm 965 to a discharge mechanism 980 which forms no part of the present invention but which is adapted to open the blocks on the return run of the conveyor to discharge the filled and stoppered vials from the machine. Unit 980 may be of any desired construction but preferably employs a reciprocatable member for separating the clamping sections of the vial supporting blocks 65 on conveyor 60.

The cams 970, 217, 974 and 967 are so related to each other and to the movement of the intermittent drive mechanism 935, 937 as to properly phase the several operations at the different stations with movement of the conveyor 60 in a synchronous manner. Preferably, all of the cams are adapted to actuate the respective follower arms or linkages at substantially the same instant during a rest period in the operation of conveyor 60.

From the foregoing description it should be apparent that the many reciprocating plungers or other mechanisms employed for actuating various stages of the above-described machine, may be driven by a variety of pneumatic, electrical and/or mechanical means well known in the art. However, it will be appreciated that various other modifications and equivalents may be employed without departing from the spirit of the invention, which is to be limited only by the scope of the appended claims.

What is claimed is:

1. A machine for filling and stoppering cylindrical containers, comprising movable container supporting means for conveying a series of cylindrical containers in upright position, reciprocating jaws synchronized with said container supporting means and responsive to container depth for detecting the presence of a bottom-forming member within said containers and for removing from said supporting means those containers lacking such a member; filling means synchronized with said container supporting means and comprising a reciprocating cylinder having an outlet projecting within said container upon actuation of said cylinder for dispensing a measured amount of medicament therefrom, a slidable piston carried within said cylinder and provided with an adjustable stop for varying the stroke of the piston with respect to the cylinder, control means to actuate said piston and cylinder when said container supporting means conveys a container into alignment with said outlet; a stopper orientation hopper provided with a stopper-receiving chute projecting therewithin for receiving stoppers therefrom in unidirectional endwise alignment, a stopper insertion magazine connecting with said chute and provided with a reciprocating plunger for ejecting stoppers therefrom into said containers, said plunger being synchronized with said container supporting means.

2. In a device for inspecting cylindrical containers, the combination comprising a reciprocating body movable toward and away from a container support, said body being provided at its base with jaws adapted to retain the throat of a container upon engagement therewith, a projection on said body for detecting the presence of a bottom-forming member within said container, said projection and said jaws being so positioned relative to each other as to normally prevent said jaws from engaging said container in the presence of a bottom-forming member, and for permitting such engagement in the absence of a bottom-forming member, and means to release said jaws upon retraction thereof from said support with a bottomless container therein retained.

3. In a device for filling open-mouthed containers, the combination comprising a vertically reciprocating cylinder having an outlet projectable within a container mouth upon actuation of said cylinder for dispensing a measured amount of medicament therefrom, a slidable piston carried within said cylinder, means within said cylinder for dispensing a measured amount of medicament upon relative movement of the cylinder and piston, an adjustable stop means cooperating with said piston for varying the stroke of the piston with respect to the cylinder, and control means to actuate said piston and cylinder when a container supporting means conveys a container into alignment with said outlet.

4. In a device for filling containers, the combination comprising a reciprocable cylinder having an outlet projectable within a container upon movement of said cylinder for dispensing a measured amount of medicament therefrom, a slidable piston carried within said cylinder and provided with adjustable means limiting the stroke thereof for varying the stroke of the piston with respect to the cylinder, means to reciprocate said cylinder and piston, electrically controlled means connected to normally block reciprocation of said piston and cylinder, and a container-engaging arm connected with said electrically controlled means to actuate said means when said container supporting means conveys a container into alignment with said outlet.

5. In a device for filling containers, the combination comprising a linearly movable container supporting means, a vertically reciprocable cylinder having an outlet projectable within a container upon actuation of said cylinder for dispensing a measured amount of medicament therefrom, a slidable piston carried within said cylinder and provided with an adjustable stop for varying the stroke of the piston with respect to the cylinder, stationary stop means projecting into the path of movement of said adjustable stop, cam means cooperating with said cylinder for reciprocating the same, a solenoid-operated stop for periodically obstructing reciprocation of said cylinder, and container-engaging means connected to energize said solenoid and thereby permit reciprocation of said cylinder when said container supporting means conveys a container into alignment with said outlet.

6. In a device for stoppering cylindrical containers, the combination comprising an open-ended, rotating hopper, a stopper-receiving, inclined chute projecting within said open end, said chute being characterized by a central longitudinal channel extending along the upper surface thereof for receiving stoppers in unidirectional endwise alignment, a shovel carried by the upper end of said chute for receiving stoppers and directing them into said longitudinal channel, said chute being further characterized by having a twisted configuration within said hopper which is adapted to gravity reject those stoppers not aligned in said channel, means for sweeping the upper surfaces of said stoppers and thereby preventing overlapping thereof within said channel, a stopper insertion mechanism connecting with said chute and comprising a reciprocating plunger for ejecting stoppers therefrom into said containers.

7. In a machine for filling and sealing open containers with a medicament, conveyor means for supporting and sequentially moving a plurality of open containers in a predetermined path, an inspecting mechanism positioned along said path and including structure for sensing the absence of a bottom forming member in a supported container and jaws for removing such container from the conveyor means, a continuously actuated container filling mechanism positioned along said path and including structure for sensing the presence of a container on said conveyor means and preventing operation of said filling mechanism in the absence of a container, a source of container closure members including chute means for orienting said members and feeding them sequentially to proximity with said path, and a closure insertion mechanism positioned along said path and connected with said orienting means for receiving closure members therefrom and including structure for inserting the closure members into the filled containers.

References Cited in the file of this patent

UNITED STATES PATENTS

| 955,551 | Reinsberg | Apr. 19, 1910 |
| 1,348,341 | Winkley | Aug. 3, 1920 |
| 1,749,161 | Schnaier | Mar. 4, 1930 |
| 2,167,895 | Kotcher | Aug. 1, 1939 |
| 2,180,836 | Risser | Nov. 21, 1939 |
| 2,401,499 | Nelson et al. | June 4, 1946 |
| 2,524,594 | Franz | Oct. 3, 1950 |
| 2,582,494 | Lorenz | Jan. 15, 1952 |
| 2,596,342 | McNutt et al. | May 13, 1952 |
| 2,605,036 | Cozzoli | July 29, 1952 |